United States Patent [19]
Marino et al.

[11] Patent Number: 6,167,137
[45] Date of Patent: Dec. 26, 2000

[54] SECURE COMMUNICATIONS IN A WIRELESS SYSTEM

[75] Inventors: Francis C. Marino, Dix Hills; Thomas P. Schmit, Huntington, both of N.Y.

[73] Assignee: Pittway Corp., Chicago, Ill.

[21] Appl. No.: 09/447,778

[22] Filed: Nov. 23, 1999

Related U.S. Application Data

[62] Division of application No. 08/667,847, Jun. 20, 1996, Pat. No. 6,026,165.

[51] Int. Cl.⁷ .................................................. H04K 1/02
[52] U.S. Cl. ........................... 380/255; 380/270; 380/271
[58] Field of Search .................................. 380/255, 270, 380/271

[56] References Cited

U.S. PATENT DOCUMENTS

| | | | |
|---|---|---|---|
| 4,596,898 | 6/1986 | Pemmaraju | 178/22.16 |
| 5,285,496 | 2/1994 | Frank et al. | 380/9 |
| 5,991,410 | 11/1999 | Albert et al. | 380/24 |

*Primary Examiner*—Thomas R. Peeso
*Assistant Examiner*—Todd Jack
*Attorney, Agent, or Firm*—Greenberg Traurig, LLP; Anthony R. Barkume

[57] ABSTRACT

Disclosed are three major aspects relating to wireless transmission of encrypted data messages in a security system wherein the receiver stores locally an encryption key utilized by the transmitting device to encrypt the data message and the receiver uses the encryption key to decrypt an encrypted data message, and wherein a sequence number generator is used to synchronously track the message sequence at both the transmitter and receiver. A first major aspect involves encrypted device registration (learning) methods that are user-friendly and immune from detection by technically skilled intruders with special RF equipment, and periodic user-friendly changing of the encryption key per encrypted transmitting device in the system. A second major aspect involves encrypted device de-registration (unlearning, or deletion) that is likewise user friendly. A third major aspect of the invention allows the receiver to process encrypted and non-encrypted messages, interchangeably, within the same wireless security system.

4 Claims, 7 Drawing Sheets

FIG. 4 *Encrypted and Unencrypted Wireless Transmitted Message Formats*

SECURE COMMUNICATIONS IN A WIRELESS SYSTEM

CROSS-REFERENCE TO RELATED APPLICATION

This application is a divisional application of application Ser. No. 08/667,847, filed on Jun. 20, 1996, now U.S. Pat. No. 6,026,165.

BACKGROUND OF THE INVENTION

The present invention relates to security of data communications in a wireless system, and in particular to such a system wherein an encryption key used by a transmitter and a receiving device may be varied and reprogrammed by a user in order to enhance the system security, wherein the encryption key is not conveyed or easily read or decrypted by human means.

Security systems utilizing short range radio frequency communications consist of a control, an RF receiver, and a variety of transmitter products that detect and transmit to the control via the RF Receiver the state of various transducers such as smoke, motion, shock & vibration detectors, door and window switches, etc. In addition to these devices, wireless keypads having numeric or alphanumeric input keys are used to remotely arm and disarm the system via the use of personal security codes entered into the keypad and transmitted to the receiver and control. Finally, wireless keys with unique serial numbers, previously learned by the system, can also be employed by the user to arm or disarm the system or to open and close a garage door, turn lights on or off, etc.

Wireless keypads and keys presently in use are designed with RF ranges of several hundred feet beyond the periphery of a protected premises. This introduces a new security problem since unwanted intruders, skilled in the art of RF receiver and transmission technology in conjunction with computer technology, can remotely and surreptitiously capture, analyze, and playback the transmissions from these devices in order to gain entry into the premises without detection by the associated security system. For example, an intruder may be in an unobserved location one hundred feet away from the protected premises and employ suitable RF equipment which could record and playback transmitted messages from an authorized user's wireless key or keypad used to disarm the security system prior to or upon entering the protected premises. The nature of the messages need not be analyzed by the intruder so long as the playback is a repeat of the same messages and in the same sequence which disarmed the security system. This is all that is necessary to counteract the protection afforded by a wireless key even with a very large serial number previously learned by the security system. In the case of the wireless keypad, the user's personal security code can be determined from unencrypted transmitted messages used to arm or disarm the system, or by simply opening a garage door or turning on a light, etc. Once the user's personal security code is thus obtained, the intruder can enter the premises any time thereafter and disarm the security system by using that security code at the system's wired security keypad.

There are many encryption and corresponding decryption algorithms used in various communication systems requiring secrecy of data and other critical information transmitted over a network from being intercepted and deciphered by unwanted sources sharing that same (wired or wireless) network. In one such system, marketed by MICROCHIP TECHNOLOGY INC. as an HCS300 Code Hopping Encoder, a unique transmitter serial number is programmed by the manufacturer at the time of production. An encryption key is generated during production by using a key generating algorithm, which uses as its inputs the transmitter serial number and a 64-bit manufacturer's code. Thus, an encryption key is generated which is unique to each transmitting device, but which cannot be changed by the user at any time and is readily breakable if the manufacturer's code and the transmitter serial number are determined. Thus, the manufacturer's code must be carefully controlled since it is a pivotal part of the overall system security. The transmitter serial number, encryption key, and sync counter number are stored in EEPROM in the transmitter. After installation of the system, when a transmitting device is activated by a user, the encoder uses the pre-stored encryption key and sync count from EEPROM to generate an encrypted sync count, which it then loads into a data word along with an unencrypted serial number and the information desired to be transferred. The decoder at the receiver then uses the received serial number to fetch from its memory the last sync count and the encryption key for that transmitter. The decryption algorithm uses the key to decrypt the received encrypted sync count and compares it against the stored sync count. If these numbers are within a predetermined range (i.e. 16), then the algorithm passes and the message is considered valid. This methodology is termed "code hopping" since the sync count is incremented or changed with a predetermined algorithm known to the transmitter and receiver with every activation of the transmitter, and the receiver and transmitter each track the sequence independently.

This type of system utilizes a preset manufacturer's code to generate the encryption key, which is not changeable for a given device with a given serial number. This is problematic and disadvantageous since the manufacturer's code is of record with the manufacturer and possibly others in privity with the system, and the code could be compromised and used to determine the encryption key for a given transmitter since the transmitter serial number is transmitted to the receiver in unencrypted format. Thus, the key could readily be reverse engineered by an intruder who determines these fixed, unchanging data. Once an intruder has ascertained the encryption key, he may intercept a transmission, decrypt the sequence number, and be able to break into the system by changing or incrementing his own number generator and encrypting a message with this data.

It is therefore desired for the system to utilize encryption keys which are randomly generated and therefore unknown to anyone, thus eliminating the possibility that the key may be compromised. In addition, it is desired to enable the encryption key to a easily changed by a user, thus enhancing the security of the system, rather than having only one, fixed encryption key for each transmitting device.

The present invention relates to the use of novel security encryption and decryption methodologies and algorithms, plus unique procedures to provide an existing wireless security system with a high degree of immunity from being defeated by intruders of high technical ability using RF receiving, transmitting, recording, playback, and computational equipment. The nature of the encryption, decryption, message formats, and procedures are uniquely designed to provide the associated security systems the ability to communicate with existing unencrypted wireless devices as well as the new encrypted ones without changes being required of existing associated security controls.

In particular, with the advent of new encrypted data transmission technologies, devices such as wireless keypads and keys with encrypted data transmissions are being added to existing systems which are still required to communicate with devices having unencrypted data transmissions. It is therefore desirable for the receivers in such systems to be able to communicate seamlessly with devices transmitting data messages in either an encrypted or unencrypted data format.

Further, the advent of new devices with encrypted data formats has led to the need for such devices to be registered, or learned, by the receiver for subsequent data transmissions. In particular, the receiver needs to register an encryption key associated with a transmitting device, and needs to be able to synchronize an internal sequence number with a sequence number generator on the device so that the communications are synchronized properly. The receiver also needs to be able to update the encryption key information in its store in order to provide a high degree of security. Finally, the system needs to be able to de-register, or unlearn a device when it becomes stolen or lost, so that an intruder having the device cannot gain unauthorized access to the secured premises. It is advantageous to implement these functions using a minimum of additional computational resources in the receiver. This allows the function to be added to existing products without significantly redesigning the product.

It is therefore an object of the present invention to provide a communications system and methods whereby the problems of the prior art described above are overcome.

SUMMARY OF THE INVENTION

The present invention relates to improvements in encryption methodologies used in a wireless data communications system suitable for use in a wireless security system. The wireless communications system is comprised of a receiving station having a receiver and a control unit, and a plurality of transmitting devices which communicate with the control via the receiver. The transmitter devices each locally provide their own encryption key which is stored in the transmitter and initially registered with the receiver, which is then utilized by the transmitter (along with a sequence number) to encrypt subsequent data messages, and which is also then used by the receiver to decrypt those messages. A sequence number generator (which may increment or change in a predetermined algorithm) is used to synchronously track the message sequence at both the transmitter and receiver. The key is preferably generated at the transmitter device in a random fashion. The user may change the encryption key for any transmitting device at any time and re-register the new random key with the receiver accordingly. The encrypted device registration (learning) methods are user-friendly and immune from detection by technically skilled intruders with special RF equipment. Selected transmitting devices may be deleted or de-registered from the receiver, or the entire store of keys and sequence numbers may be de-registered at one time. Importantly, no record of the encryption key, whether written, stored in ROM, or otherwise, exists except for the local storage at the transmitter and the receiver. In another aspect of the invention, the receiver processes encrypted and non-encrypted messages, interchangeably, within the same wireless security system.

Thus, a first major aspect of the invention is a method of configuring the receiver with an encryption key useful for decrypting encrypted data message transmissions. The method comprises the steps of randomly generating at the transmitting device a new encryption key and storing it in memory, transmitting to the receiver a data message comprised of the new encryption key and a device identification code unique to the transmitting device, receiving the data message at the receiver, and storing in a memory table the device identification code and the new encryption key. The receiving station and the transmitting device may first be placed into a programming mode in order to configure the receiver with the encryption key. A sequence number generator in the transmitting device is initialized to an initial state, and the initial state is included in the data message along with the new encryption key and the device identification code unique to the transmitting device. This message may itself be encrypted using encryption algorithms known to both the receiver and transmitter.

After received by the receiver, the data message may be stored in the memory table at the receiver by first determining if a previous data record exists in the memory table which comprises the device identification code, then overwriting the previous data record with the new data message if such a previous data record exists, or adding the new data message as a new record in the memory table if such a previous data record does not exist.

The configuration or registration process may be verified by transmitting to the receiver a second data message comprised of the device identification code and an encrypted version of the sequence number generator initial state, receiving the second data message at the receiver and fetching from the memory table the previously stored encryption key and sequence number generator initial state matched with the identification code from the received second data message, using the fetched encryption key to decrypt the encrypted sequence number generator initial state received from the second data message, comparing the decrypted sequence number generator initial state with the fetched sequence number generator initial state, and providing an indication that the receiver has successfully registered the transmitting device when the comparison step has passed.

The second major aspect of the invention is a method of configuring the receiver to de-register all of the transmitting devices and temporarily disable subsequent encrypted data communications therewith pending re-registration of a transmitting device. The method comprises the steps of configuring the receiving station and the transmitting device into a programming mode, transmitting to the receiver from one of the previously registered transmitting devices a first data message comprised of a command to delete all registration data from an internal memory table, deleting all registration data from the receiver internal memory table, temporarily disabling the receiver from responding to further encrypted data messages, and transmitting to the receiver from the transmitting device a second data message in unencrypted format, the second data message comprising a command to cause an indication (such as an audible beep) that the de-registration process was successful.

In the alternative to de-registering all the devices, a selected one of the devices may be de-registered (if the identification code is known) by configuring the receiving station and a different one of the previously registered transmitting devices into a programming mode, transmitting to the receiver from the transmitting device a first data message comprised of a command to delete the registration data associated with the selected device from an internal memory table, deleting the registration data from the receiver internal memory table, and temporarily disabling the receiver from responding to further encrypted data messages from the selected transmitting device.

The third major aspect of the invention is a method for automatically discriminating between unencrypted and encrypted messages, which comprises the steps of receiving at the receiving station a message from a transmitting device, storing the message in a buffer, analyzing a portion of the stored message to determine if was validly received, and further processing the message portion as a validly received unencrypted message when the message portion has been so determined to have been validly received. When the message portion has, however, been so determined to have not been validly received, then the entire stored message is analyzed to determine if it was validly received. The entire stored message is then further processed as an encrypted message when it has been so determined to have been validly received, and it is ignored when it has been so determined to have not been validly received.

This methodology is successful because an encrypted data message is longer than an unencrypted message, and thus by allowing the receiver to store an entire data message and first analyzing a portion of the entire message, it can be determined if that portion is a valid (unencrypted) message. If the portion cannot be validated, then the entire message is examined to ensure that it is a valid (encrypted message). Preferably, the message portion comprises a cyclic redundancy character, and the message portion is analyzed by performing a cyclic redundancy check routine on the message portion and comparing the results to the message portion cyclic redundancy character. Thus, if the cyclic redundancy check routine passes, the message portion must be valid and the message is unencrypted. If the message portion is not an unencrypted message, then the message will also preferably comprise a message cyclic redundancy character, and the message is analyzed by performing a cyclic redundancy check routine on the message and comparing the results thereof to the message cyclic redundancy character. Notably, the message portion cyclic redundancy character and the message cyclic redundancy character are located in different positions of the message.

The present invention is embodied by a secure data communications system suitable for transmission of data messages, comprising a plurality of remote transmitting devices for transmitting the data messages, and a receiving station comprising a data receiver for receiving the data messages from the transmitting devices. Each of the devices of the present invention comprises a random key generator for randomly generating data encryption keys suitable for use in encrypting data messages prior to transmission, a sequence number generator for keeping track of the transmission sequence number, the sequence number generator being changed for each data transmission, a memory for storing the randomly generated encryption key and a device identification code unique to the transmitting device, means for encrypting data prior to transmission, the encrypting means utilizing the encryption key and sequence number stored in non-volatile memory, and transmitter means for transmitting a data message comprised of an encrypted data field, an unencrypted device identification field, and an encrypted sequence number field. The receiver accordingly comprises a memory table comprising a plurality of data records, each of the data records comprising a device identification code, an encryption key, and a transmission sequence number associated with one of the transmitting devices, means for fetching from the memory table the data record associated with a data message received from a transmitting device by utilizing a device identification code from the received data message, means for decrypting the sequence number and data field from the received data message by using the encryption key from memory, means for comparing the decrypted received sequence number with the transmission sequence number fetched from memory, and means for allowing the decrypted received data message to be transmitted to a control unit associated with the receiver when the decrypted received sequence number and the transmission sequence number fetched from memory are within a predetermined range.

DETAILED DESCRIPTION OF THE PREFERRED EMBODIMENT

Figure 1:
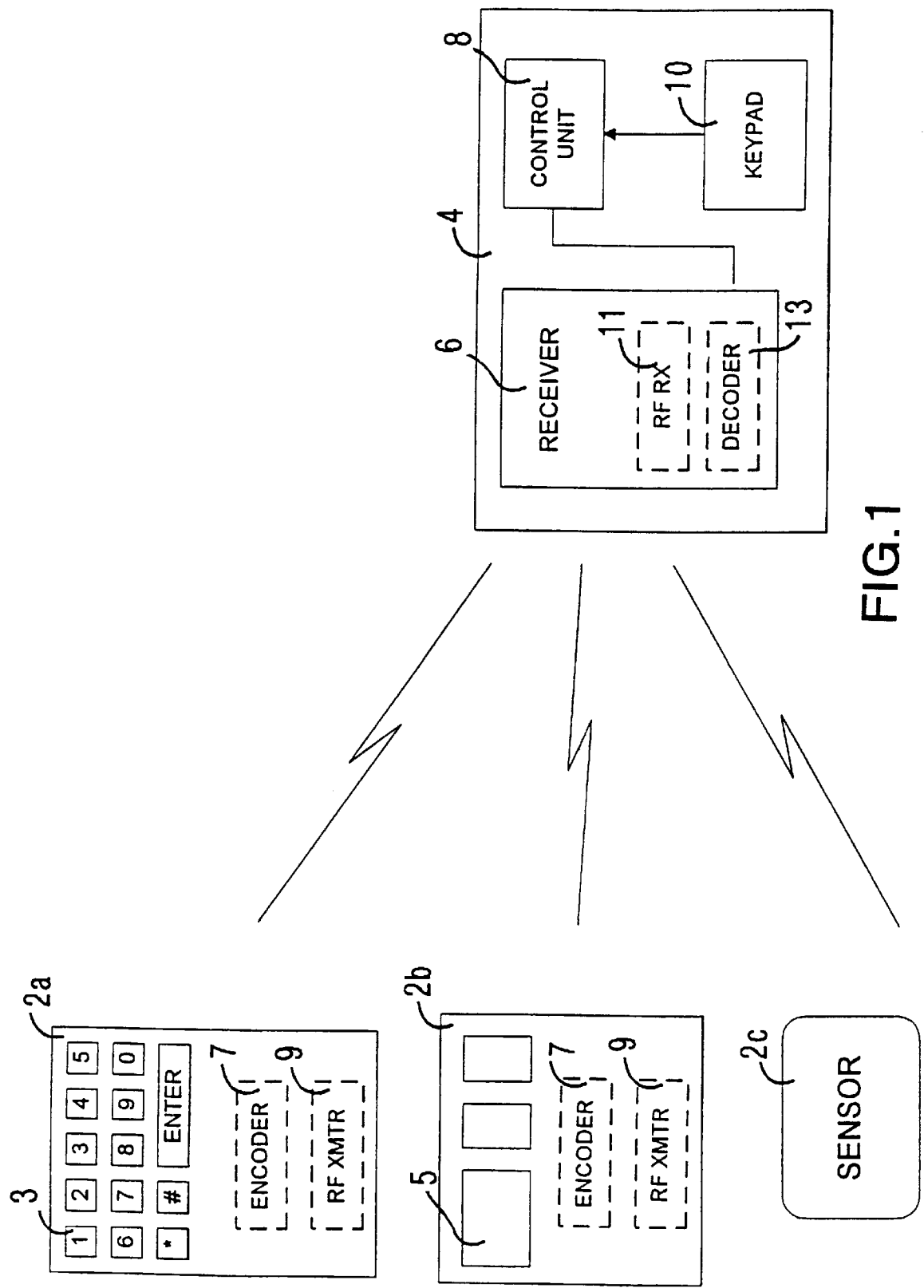
FIG. 1 is an overall block diagram of a wireless security system suitable for use with the present invention.

FIG. 1 is an overall block diagram of a wireless security system used with the secure data communications system of the present invention. Illustrated are a plurality of transmitting devices 2, in particular a wireless keypad 2a, a wireless key 2b, and a sensor 2c such as a smoke sensor well known in the art. Although transmitting devices are used in the preferred embodiment, it is understood that transceiving devices, having receiving functions as well as transmitting functions, may be used as well. The transmitting devices are in wireless, i.e. radio frequency (RF) communication with a receiving station 4, which is comprised of an RF receiver 6, a control unit 8, and a keypad 10. The keypad 2a typically has numeric or alphanumeric keys 3 for inputting a personal identification number (PIN) in order to gain access to the security system, e.g. to disarm the system prior to entering the guarded premises. The wireless key 2b typically has a few non-numeric keys 5 with dedicated programmable functions, e.g. opening a garage door, or turning on a light within the guarded premises. An authorized user activates the transmitting device 2a or 2b, and an encrypted command is generated by an encoder section 7 and sent by an RF transmitter 9 to the receiver 6. The receiver 6 receives and processes the message with an RF receiver 11 and then decrypts the message with a decoder section 13, as explained further below, and passes on the command information in unencrypted format to the control unit 8 to which it is wired. The keypad 10 allows a user to execute certain commands locally, such as arming or disarming the system, entering a programming mode (to be described herein), and the like. The smoke sensor 2c transmits messages to the receiver 6 in standard, unencrypted format as well known in the art. The control unit 8 and keypad 10 are also well known in the art of security systems and need not be explained in detail here. The receiver 6 provides both unencrypted and encrypted data communications with the appropriate transmitting device 2 through the auto-discrimination process of the present invention, as will be explained in detail herein. Importantly, in accordance with the present invention, the encryption methodologies are transparent to the control unit 8, and thus a receiver 6 in accordance with the invention may be made compatible with various control units 8 already on the market. In addition, due to the auto-discrimination aspect of the invention, the receiver 6 is able to determine automatically if a certain transmission is unencrypted or encrypted, and it can process it accordingly and pass it on to the control 8 in a similarly transparent fashion. Thus, prior art unencrypted transmitting devices such as sensor 2c may be used without modification with the receiver 6 of the present invention.

Figure 2:
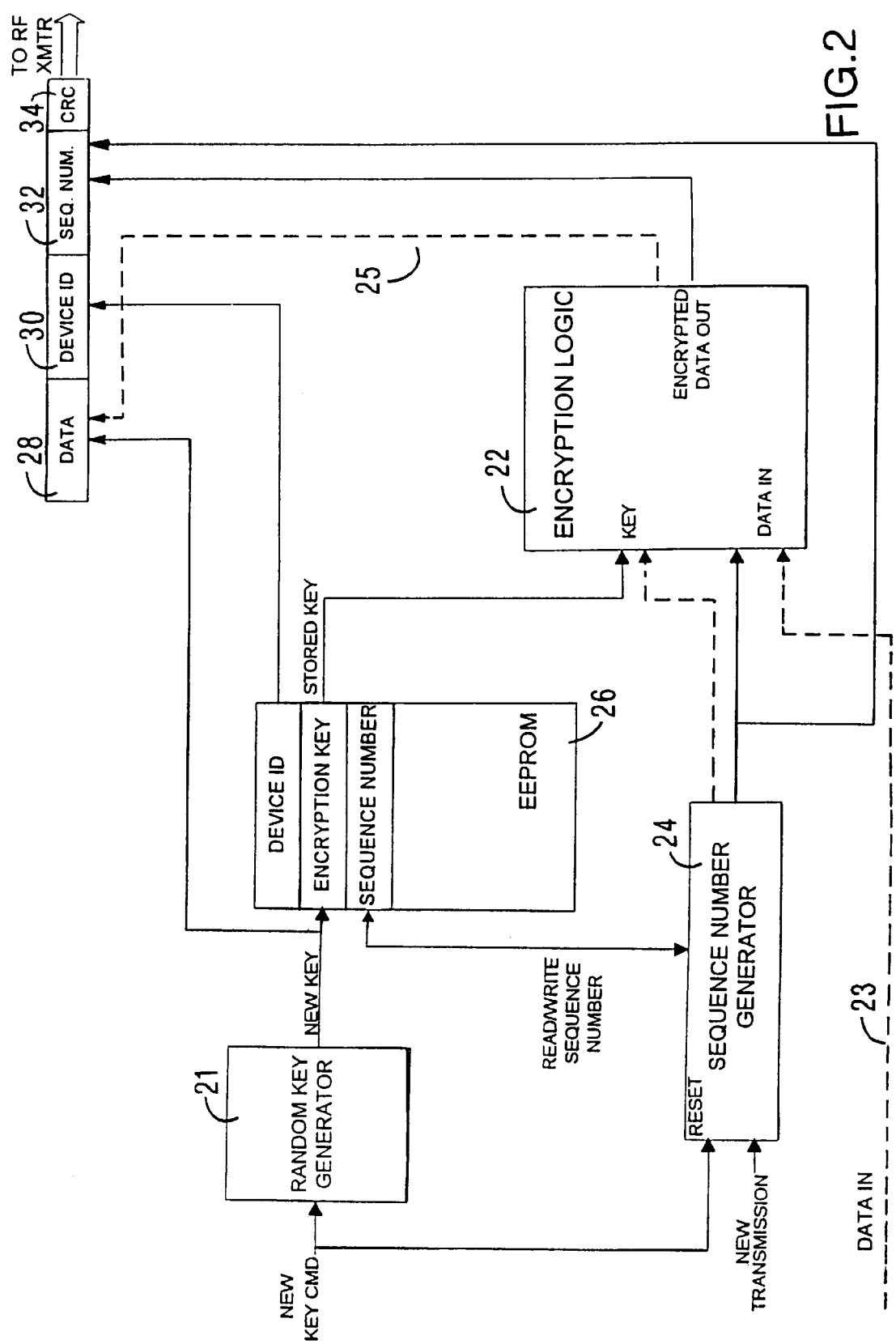
FIG. 2 is a block diagram of the transmitter encoder section of the present invention.

The encoder 7 is shown in the block diagram of FIG. 2, and comprises a random key generator 21, encryption logic 22, a sequence number generator 24, and a non-volatile memory 26 such as an EEPROM for storing an identification number (Device ID) unique to each transmitting device, the current randomly generated encryption key, and the current sequence number for the transmitting device 2. The Device ID is programmed at the factory by the manufacturer, identifies the device uniquely, and in general is unchangeable. The encryption key and sequence number are variable, however, as explained below.

In normal, data communications operation, the data message to be formed by the encoder and transmitted to the receiver 6 comprises a data field 28, a Device ID field 30, a sequence number field 32, and a CRC field 34. The data field 28 comprises the data desired to be sent to the control; e.g. a request by the user to disarm the system, along with the user's entered PIN. The data field 28 is sent in normal operation in encrypted format, and is derived by the encryption logic 22 in conjunction with the key previously generated by the random key generator 21 and stored in both the transmitter EEPROM 26 and the receiver 6 via a registration (learning) process along with the current sequence number stored in the EEPROM 26. (This data flow is shown by dotted lines 23 and 25, and is not part of the present invention but is provided herein for purposes of illustration and completeness). The combination of the randomly generated key and the sequence number for encryption purposes may be termed a "superkey" since it is more secure than the encryption key alone, The Device ID is loaded into the message in field 30 in standard, unencrypted format, and will be used by the receiver 6 to fetch the encryption key stored locally at the receiver. The sequence number field 32 (along with key or keypad data in field 28) is sent in encrypted format and is derived by the sequence number stored in EEPROM 26 and changed or incremented for every transmission by the sequence number generator 24, and is used by the receiver 6 to ensure that the communication is received from an authorized transmitter. The sequence number generator increments or changes in a predetermined fashion, which is known by both the receiver and the transmitter. The algorithm may be a simple increment by one, two, four, etc. or may be a pseudo-randomly changing sequence. The CRC (cyclic redundancy character) field 34 is filled with a CRC character generated in accordance with techniques well known in the art, and is used by the receiver 6 to ensure the integrity of the data being transmitted.

Although it is preferred to generate the encryption key in a random fashion in order to provide maximum security, it is contemplated that other ways of providing encryption keys may be implemented, such as a sequential count provided by a counter or shift register, a sequence of predetermined non-random numbers stored in memory, etc.

Figure 3:
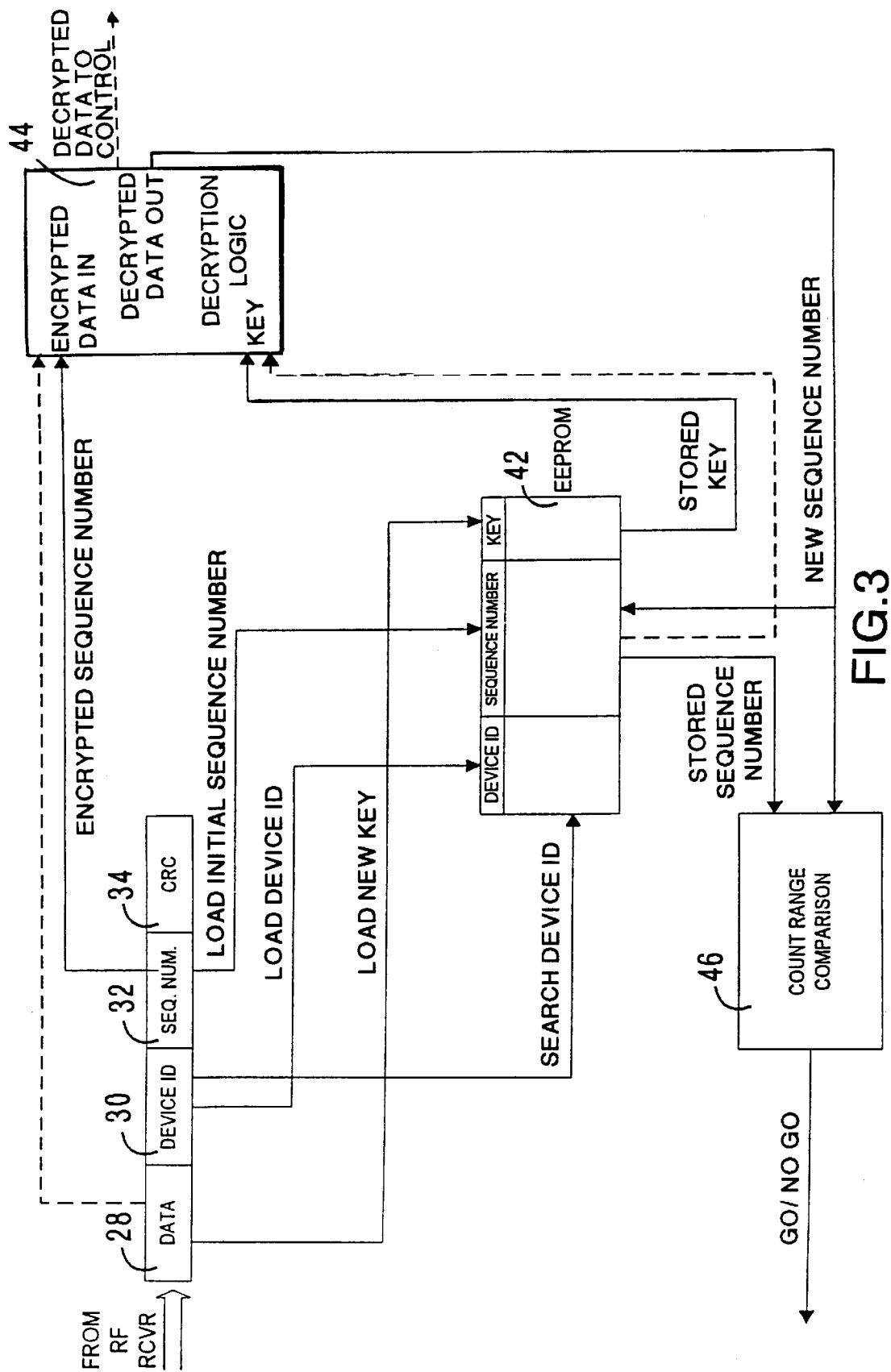
FIG. 3 is a block diagram of the decoder section of the receiver of FIG. 1.

The receiver 6 comprises a decoder section 13, shown in FIG. 3, which comprises a memory table 42 such as an EEPROM which contains data records having sequence number and encryption key data stored therein along with the associated Device ID. That is, for each transmitter registered with the receiver, a record exists in memory 42 which comprises the unique transmitter identification number Device ID, the most recent sequence number for that transmitter, and the encryption key for that transmitter. When a normal data encrypted message is received, the decoder 13 searches its memory table 42 looking for a match of the received (unencrypted) transmitter identification number Device ID, and when it finds the proper record, it fetches the encryption key and the stored sequence number for that transmitter. The decoder 13 uses the fetched key and sequence number as a superkey to decrypt with decryption logic 44 the encrypted sequence number 32 from the received message. The decoder then compares, with comparison logic 46, the decrypted new sequence number with the stored sequence number, and, if they are within a predetermined range of each other, it decrypts the message data field and flags the data as valid with a GO signal and passes it on to the control for further processing. This is shown by the dotted lines in FIG. 3. The sequence number is kept in synchronization with the current transmitter sequence number by overwriting the sequence number in memory 42 with the decrypted new sequence number.

Importantly, the present invention allows the user to easily and readily register any transmitting device's randomly generated encryption key with the receiver, to change the existing encryption key of any such device in such a fashion that there is no human readable record of the key (and therefore no one knows the updated key), thus ensuring the security of the system.

Figure 4:
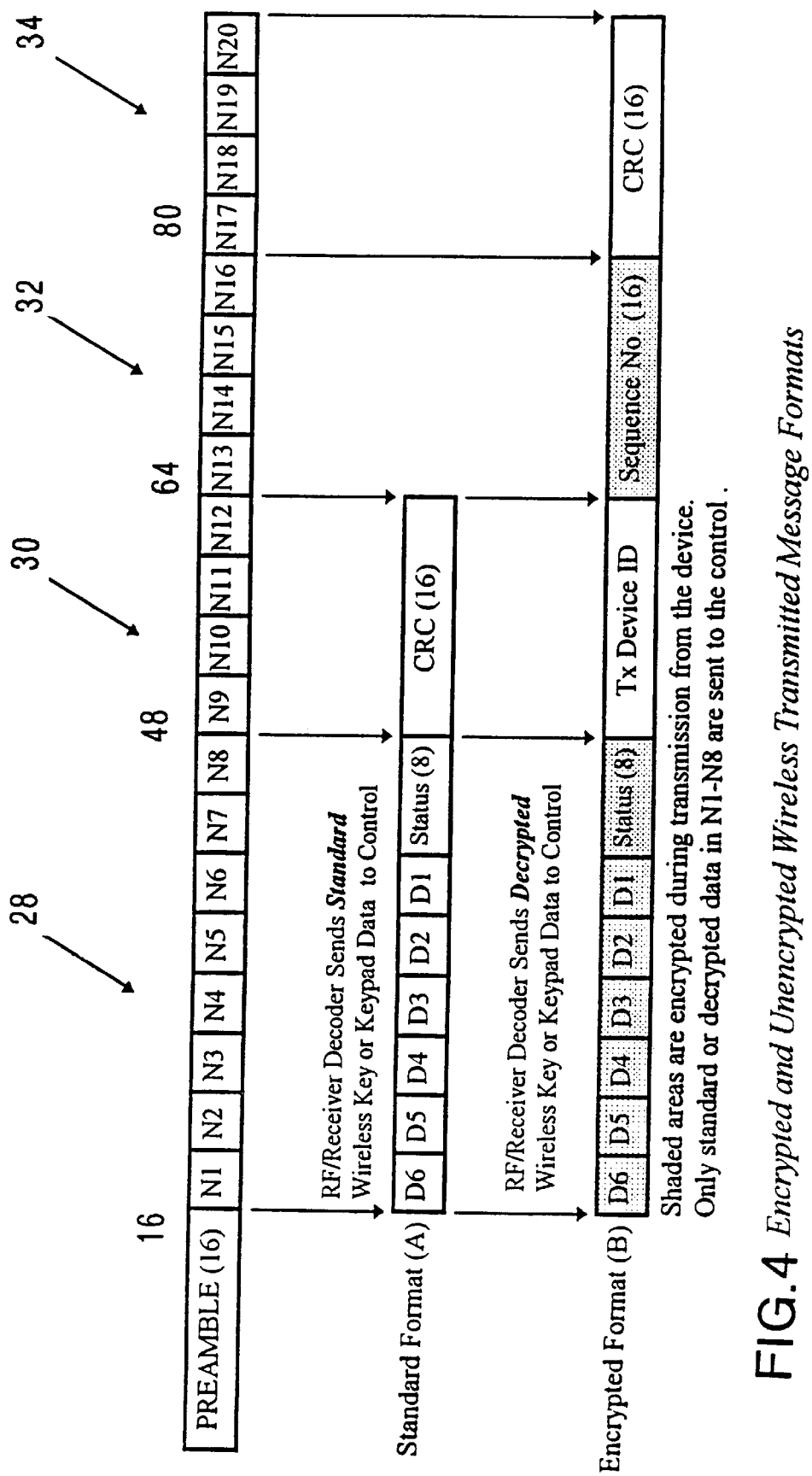
FIG. 4 is a diagram of the message formats used in the present invention.

FIG. 4 illustrates in detail the message format of the present invention for both unencrypted messages (Standard Format A) and encrypted messages (Encrypted Format B). With reference to Encrypted Format (B), each encrypted wireless key 2b or keypad 2a is identified by the receiver using a unique, factory-configured, 16-bit number in N9–N12 (field 30) referred to here as the Device ID (distinguished from a wireless key serial number ID or a user security code in D1–D6 that is passed on to and recognized only by the control). This unique Device ID must be registered or "learned" by the receiver before the transmitting device can communicate its normal D1–D6 data to the control via encrypted messages to the receiver. Since the receiver processes multiple, encrypted keys and keypads as well as unencrypted wireless devices, the receiver must be able to add or delete encrypted Device IDs and their unique encryption keys to its internal non-volatile memory 42.

Figure 5:
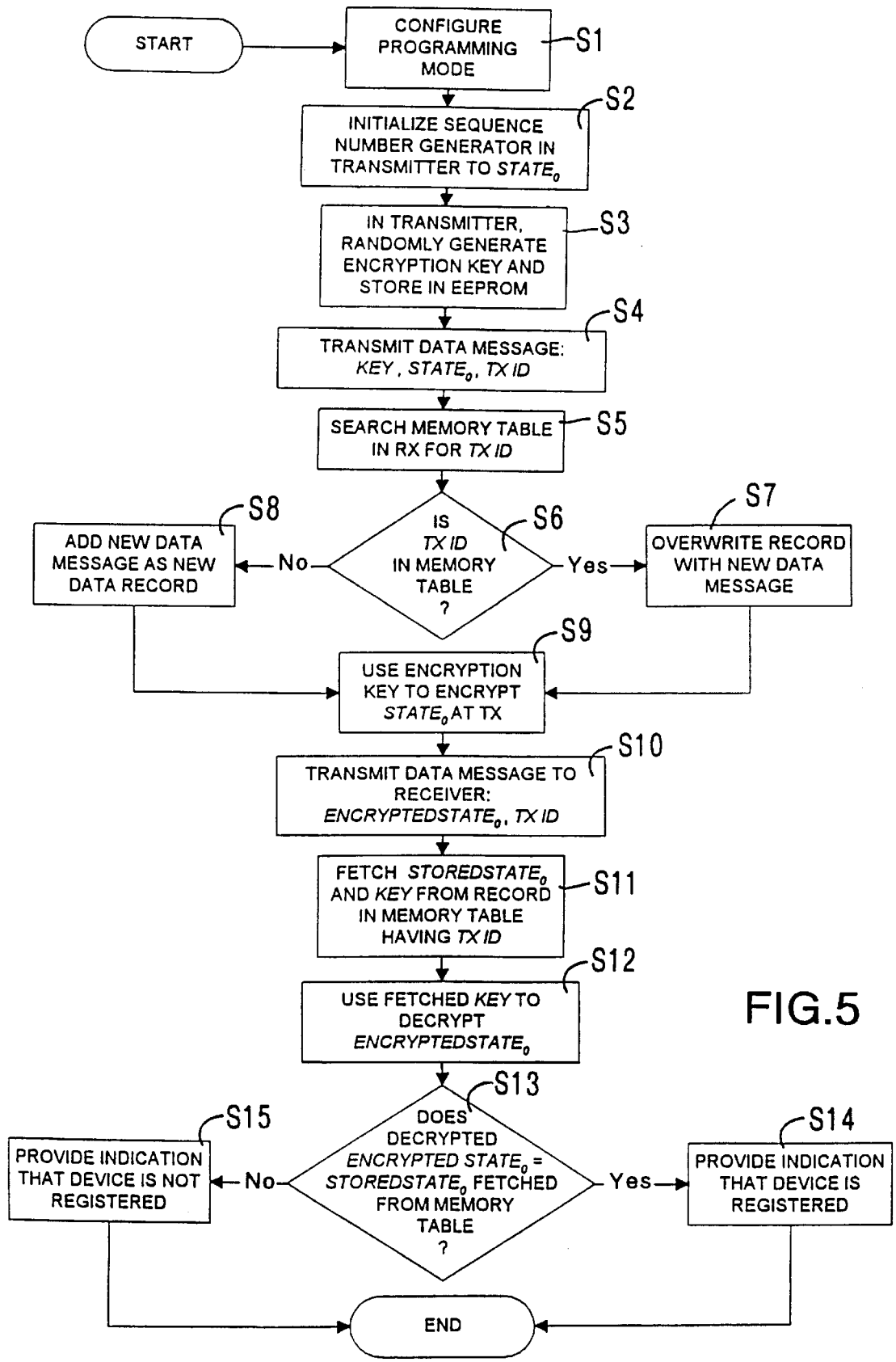
FIG. 5 is a flowchart of the method for changing encryption keys in the present invention.

In order to avoid possible manipulation by technically skilled intruders, the user first places the security control into a programming mode of operation, which is called a TEST mode in the preferred embodiment, using his or her multi-digit security (PIN) code. For example, this may be done by depressing a specific key sequence on the wireless device 2 and/or a specific key sequence on the keypad 10 at the receiving station 4. It is only following reception of this command from the control and throughout duration of this TEST mode, that the receiver will permit the addition (learning) or deletion (unlearning) of encrypted wireless devices. The learning process is summarized here as follows with reference to the flowchart in FIG. 5.

To learn a new encrypted wireless key 2b or keypad 2a, the control is first placed in its TEST mode as shown at step S1. The keypad is then placed in an encryption learning mode by activating special keys (not used during normal operation) appropriate to the device. For example, the user may need to depress three keys at once in order to trigger the programming or TEST mode. In this encryption learning mode, the wireless key or keypad clears its sequence number generator 24 to an initial state (STATE$_0$) at step S2 and generates a random encryption key KEY at step S3 which it stores internally in memory 26 and which it will use, along with the sequence number, as a superkey in the encryption process. In step S4, it then repeatedly transmits two 5-message sequences, or pentads, in which each of the messages in a given pentad are identical and of the 96-bit message format as shown in FIG. 4. The pentad message format is described fully in co-pending application Ser. No. 08/650,292, filed on May 20, 1996, and assigned to the assignee of this application. Each message of the first 5-message pentad is unencrypted wherein the encryption key is contained in pre-determined positions within N1–N8 (field 28); the unique Device ID is in N9–N12 (field 30); the initial sequence number STATE$_0$ is in N13–N16 (field 32); and a cyclic redundancy character CRC is in N17–N20 (field 34). The receiver will associate the new random encryption key with the Device ID provided the control is in the TEST mode; the correct system code exists in the status byte; and at least two messages of the pentad exactly match. The random encryption key, together with the corresponding Device ID and the initial sequence number STATE$_0$ are then inserted into the memory table 42. None of this data is sent to the control since it is intended only for registration with the receiver.

At step S5, the memory table 42 at the decoder 13 is searched to determine if the Device ID and corresponding key and sequence data has already been stored from an earlier registration. If found at step S6, the decoder 13 will simply overwrite the old encryption key and sequence number associated with that Device ID as shown at step S7. If no Device ID match is found, then the device is being registered for the very first time, and the data is written into a new location in memory 42 as shown by step S8.

The second of the dual pentads is encrypted in positions N1–N8 (field 28) and N13–N16 (field 32) using only the encryption key with the encryption logic 22 as shown at step S9 and transmitted with the unencrypted Device ID as shown at step S10. Note that in normal operation, the random key and current sequence number are used as a superkey to encrypt (and decrypt) the data, but in this learning process only the random key is used. N1–N8 (field 28) contains a special command which may be used to cause the control to issue a distinctive audible annunciation (i.e., 3 short beeps). N13–N16 (field 32) contains the sequence number encrypted with the random key. Thus, the second (encrypted) pentad serves to provide audible acknowledgment of the learning process provided by the first (unencrypted) pentad, as shown at step S14. This process continues until terminated by the user using a special keying sequence. More than one encrypted wireless device can thus be learned (by more than one receiver if required) with each device having its own random encryption key associated with its Device ID.

At step S11, the encryption key and stored sequence number are fetched from the memory table 42 as a function of the Device ID received in the encrypted message. The fetched encryption key is used by the decryption logic 44 to decrypt the received sequence number (step S12), and step S13 compares the decrypted sequence number with the stored sequence number. If these are within a predetermined range of each other (i.e. within 100), then the test has passed and a GO signal is issued to provide the indication of successful registration such as a beep at step S14. If the comparison fails, then an indication is made (optionally) at step S15 that the device has not been successfully registered.

It is noted that although the use of a second (encrypted) message to verify that the registration was successful is used in the preferred embodiment, this verification step is optional, and the system may proceed upon the receipt of just the first message containing the new encryption key.

Although the superkey actually changes with each transmission since the sequence number changes, it is a good practice for the user to periodically change the random key portion of the superkey in order to further immunize the security system from being defeated by technically skilled intruders. This is easily done with the present invention by placing the security system into the programming or TEST mode and repeating the registration procedure described above. A new encryption key will automatically be generated by the device as a consequence of making it enter the encryption learning mode. When the system is in TEST mode and a new randomly generated encryption key is received by the receiver, it searches the memory table 42 to see if the Device ID has already been stored from an earlier registration. If found, the receiver will simply overwrite the old encryption key and sequence number associated with that Device ID. This process may be repeated for each of the encrypted devices in the system without increasing the size of the receiver's database since no new devices were added. New encryption keys, known only by the receiver and each respective device, can thus be generated by the user whenever the user desires to do so, further confounding the would-be intruder.

To delete, or unlearn, encrypted devices which were lost or stolen, it is most secure to first delete all of the devices previously learned and then to re-learn the devices remaining in the system. This follows from the fact that, in order to keep the learning process user-friendly, it should not be required of the user to keep human readable records or assign human readable identification to each encrypted device to be learned by the receiver. It should only be required of the receiver to keep an internal record of each Device ID and associated random key learned, both of which need not be known by the user. Also, since a device that is lost or stolen is not available for use in a deletion process, it is most secure for the user to simply delete the entire database in memory 42 and re-learn the devices known to be in trusted hands. This same re-learning process is recommended to the user to periodically change the encryption key of any one or all devices as described later.

Figure 6:
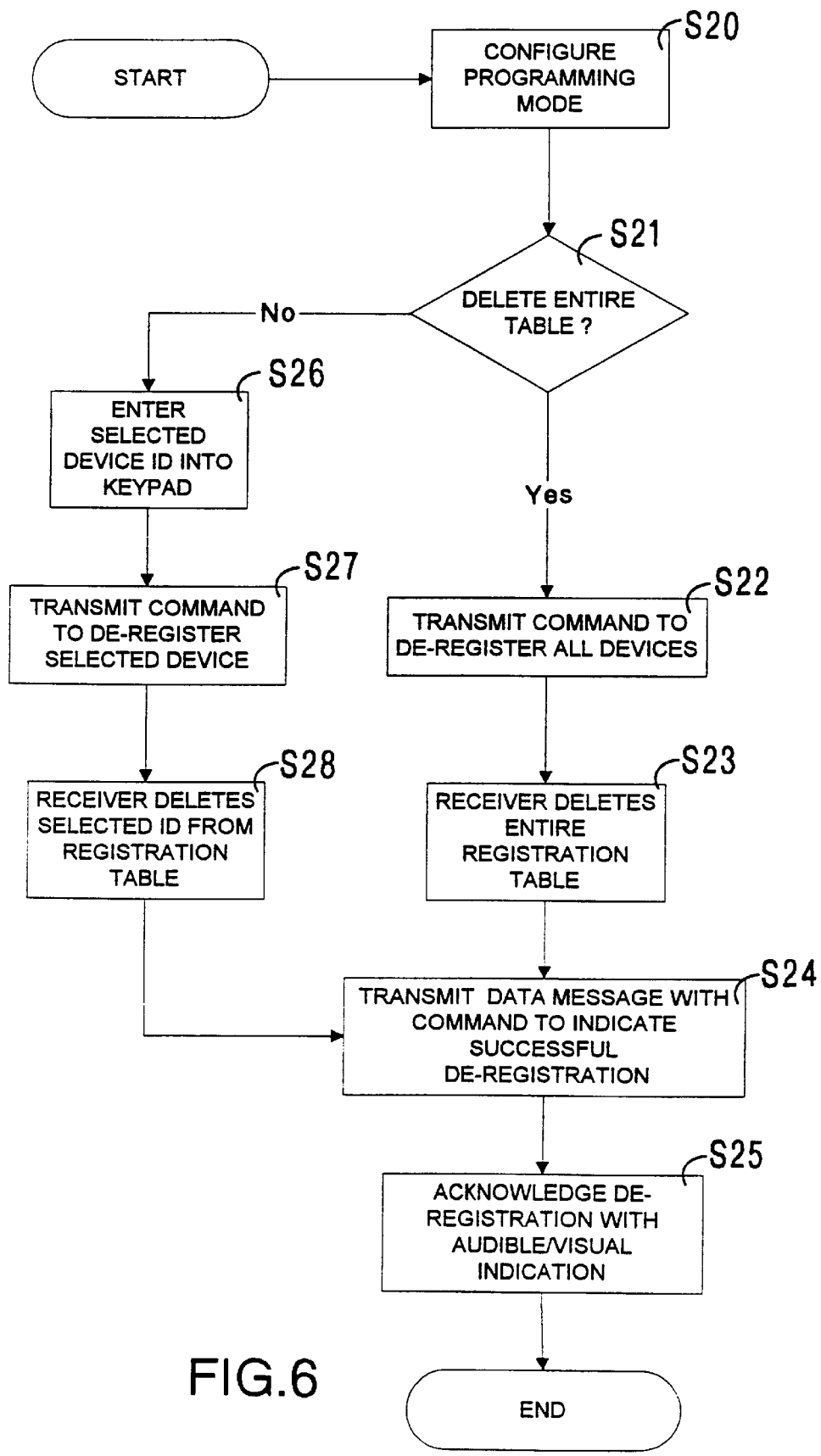
FIG. 6 is a flowchart of the de-registration process of the present invention.
Figure 7:
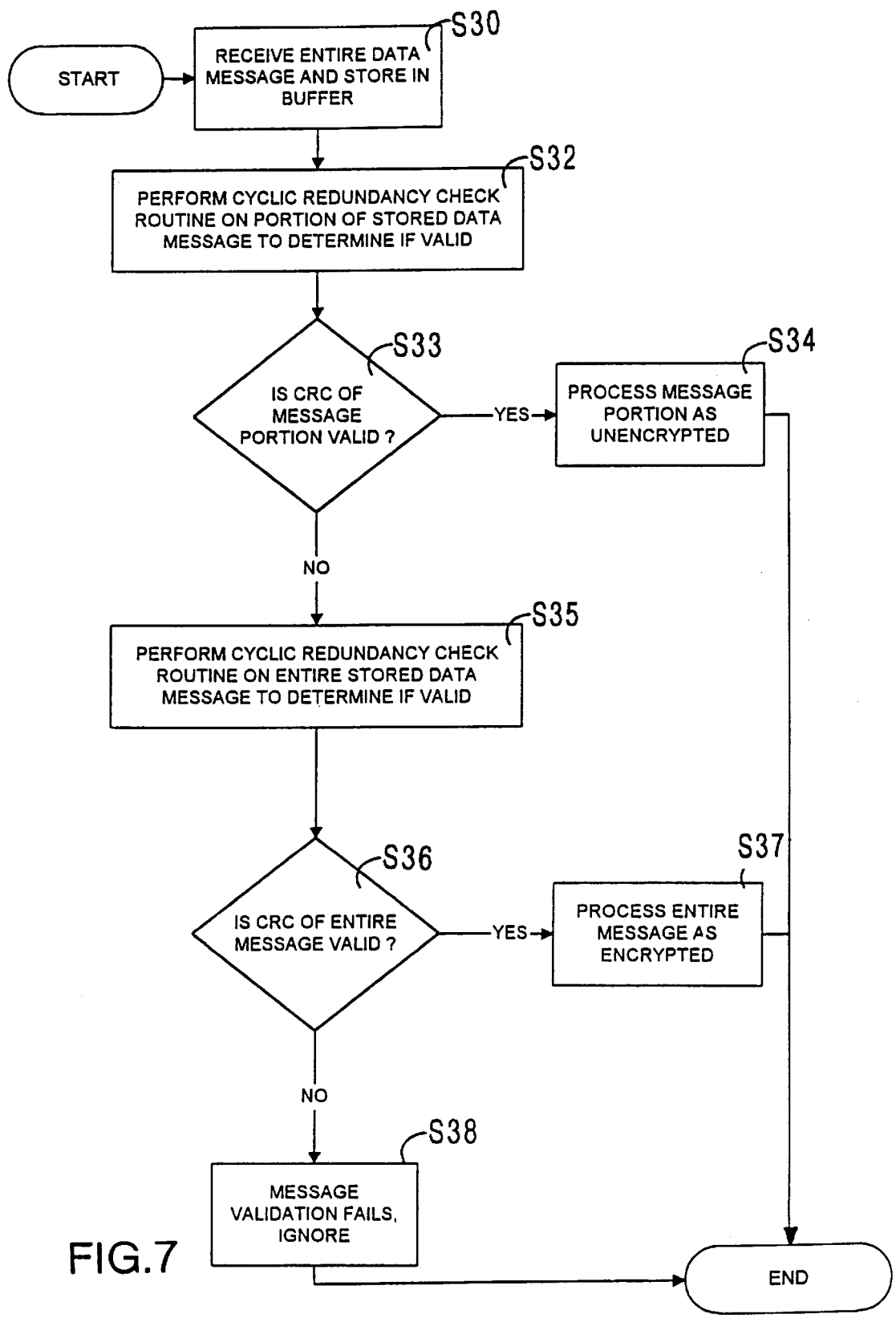
FIG. 7 is a flowchart of the automatic message format discrimination of the present invention.

Therefore, with reference to the flowchart of FIG. 6, to delete all of the devices previously learned from the receiver's memory 42, the user first places the control in the programming or TEST mode at step S20 and then activates a special keying sequence using a wireless keypad. This causes the wireless keypad to transmit dual pentad message sequences as with the learning process but with the following differences: the first pentad at step S22 will conform to message format (B) in FIG. 4 with FFFF hex in the sequence number position N13–N16, in place of the normal encrypted sequence number, which indicates that the entire memory 42 is to be deleted. The encrypted data in N1–N8 will be a special code, such as A00000 hex, to instruct the receiver to delete all of the Device IDs from its encryption database. Only after receiving at least two of these first 5 messages which exactly match the same data just described, will the receiver delete at step S23 its entire encryption database in the non-volatile memory 42 and respond thereafter to only unencrypted messages of format (A) in FIG. 4. The second message pentad at step S24 will be of the unencrypted format (A) with a simple unencrypted message that may be used to cause the control to emit an audible annunciation at step S25 to acknowledge the deletion. The user can immediately, or later on, enter the learning mode and re-learn one or more of the desired devices.

In an alternative embodiment, the entire memory table 42 need not be deleted if a user is able to keep a log of which devices are registered with the system and in what order they are registered. When it is desired to de-register a particular device, a code may be entered via any of the wireless keys still registered with the receiver or with a specially designated wireless key, and an instruction may be issued to the receiver to delete only the encryption key record for the selected device. This method of de-registration is advantageous since it allows selective de-registration and does not require the user to re-register the remaining devices, but it is less secure in that it does require the user to keep a log of which devices are registered with the receiver. This procedure is exemplified by steps S26, S27 and S28.

In another major aspect of the invention, the receiver is able to auto-discriminate and automatically differentiate unencrypted messages from encrypted messages and pass the data on to the control in a seamless and transparent fashion. Differentiating encrypted from unencrypted RF transmission messages within the same wireless security system is demonstrated by the two wireless message formats presented in FIG. 4. In this figure, twenty 4-bit nibbles, N1–N20 plus a 16-bit preamble amounts to a maximum (encrypted) message length of 96 bits. A standard (unencrypted) message length is 64 bits long consisting of a 16-bit preamble plus the twelve 4-bit nibbles, N1–N12. The decrypted or standard unencrypted data, D1–D6, represents the data originally keyed on a wireless keypad by the user, (packetized in groups of up to 6 digits), or a unique 24-bit wireless key serial number. The single 8-bit status byte includes special device information used by the control to differentiate wireless keypad data from non-wireless keypad data, such as may originate from wireless keys and standard transmitters previously programmed in the security system. In the case of wireless keypad, the status byte also contains a system code. N1–N6 contains keypad data rather than a serial number. The system code is manually programmed into each keypad and control. It insures that transmissions from keypads are accepted only by controls which have been programmed with the same system code.

This system code is initially transmitted to the receiver by the control to insure that only system devices are processed by the receiver, whether they are of the encrypted or unencrypted versions. It is distinct from the Device ID contained in N9 thought N12. The latter is unique to each keypad and is programmed into the keypad at the time of manufacture. Its use is completely transparent to the user. Once the transmitter is registered with the receiver, the system code is no longer an essential requirement.

A Cyclic Redundancy Check (CRC) code is appended to each transmission (N17 through N20) in order to verify that the transmission is received without error. It is also used in differentiating between encrypted and unencrypted transmissions as described below.

Before analyzing the received message, the receiver allows for storage at step S30 of the entire 80 information bits, N1–N20 since in the preferred embodiment it is simpler for the receiver not to anticipate the length of the message. An unencrypted message format (A) is assumed if correct CRC occurs following examination of the 48 bits, N1–N12, at steps S32 and S33. In this case the remaining 32 bits, N13–N20, are ignored and the standard data contents contained in N1–N8 are sent to the control by the receiver via a standard wired interface, as shown at step S34. If the N1–N12 portion of the received message fails the CRC check, an encrypted message format (B) is assumed if correct CRC then occurs from N1 to N20, as shown at steps S35 and S36. In this case the encrypted portions of this message, N1–N8, and N13–N16, are decrypted by the receiver with the same encryption key used by the wireless key or keypad which transmitted the encrypted message, as shown at step S37. The wireless key or keypad ID contained in N9–N12, as well as the CRC in N17–N20, is transmitted unencrypted in order for the receiver to locate the encryption key associated with that specific wireless device stored in its database, as has been previously described. If both CRC's fail, then the message is ignored at step S38. Note that the order of CRC calculation can be changed; the order described above was chosen in order to lessen the computational requirements of the receiver since it is more likely, in this scenario, that the message will be in unencrypted format than in encrypted format. If, however, the converse is true, then the encrypted format CRC would be checked first.

It can be seen, from the above discussion, how the receiver differentiates an encrypted message from one that is a standard, unencrypted one. Namely, it allows for reception and storage of the maximum of 80 information bits, in anticipation of an encrypted message, even if the received message turns out to be of the standard unencrypted message only 48 bits long. Then it examines N9–N12 for correct CRC. If the CRC is correct, the standard unencrypted message is assumed followed by the process described above for format (A). If CRC fails in those bit positions, it checks for correct CRC in N17–N20. If the CRC is correct there, the encrypted message is assumed followed by the process described for format (B). If both CRC checks fail, an error in reception has occurred and the received data is discarded. It is with this method that the receiver can process encrypted and unencrypted messages interchangeably.

The circuitry and logic used to implement the encoding functions and decoding functions described herein may be in the form of microprocessors and associated memory devices such as ROM, RAM, EEPROM, etc. as well known in the art of circuit design. The various functions and algorithms described herein, as exemplified by the provided flowchart diagrams, are readily implemented by programming techniques and encryption and decryption methodologies known the art. In addition to standard microprocessor-based circuitry, the above-described functions may be integrated within a dedicated application-specific integrated circuit (ASIC), dedicated logic chips, or any combination thereof.

What is claimed is:

1. In a communications system comprising a plurality of remote transmitting devices and a receiving station having a receiver associated therewith, a method for determining whether a message received from a transmitting device is encrypted or unencrypted, said method comprising the steps of:

a) receiving at said receiving station a message from a transmitting device;
   b) storing said message in a buffer;
   c) analyzing a portion of said stored message to determine if was validly received;
   d) further processing said message portion as a validly received unencrypted message when said message portion has been so determined to be validly received;
   e) analyzing said stored message to determine if it was validly received when said message portion has been so determined to be not validly received;

f) further processing said stored message as an encrypted message when said stored message has been so determined to be validly received;

g) ignoring said stored message when said stored message has been so determined to be not validly received; wherein said message portion comprises a message portion cyclic redundancy character, and wherein said message portion analyzing step comprises the step of performing a cyclic redundancy check routine on said message portion and comparing the results thereof to said message portion cyclic redundancy character.

2. The method of claim 1 wherein said message comprises a message cyclic redundancy character, and wherein said message analyzing step comprises the step of performing a cyclic redundancy check routine on said message and comparing the results thereof to said message cyclic redundancy character.

3. The method of claim 2 wherein said message portion comprises a message portion cyclic redundancy character, and wherein said message portion analyzing step comprises the step of performing a cyclic redundancy check routine on said message portion and comparing the results thereof to said message portion cyclic redundancy character.

4. The method of claim 3 wherein said message portion cyclic redundancy character and said message cyclic redundancy character are located in different positions of said message.

\* \* \* \* \*